No. 834,308. PATENTED OCT. 30, 1906.
J. E. LEE.
INKING ROLL TRUCK FOR PRINTING PRESSES.
APPLICATION FILED AUG. 1, 1904.
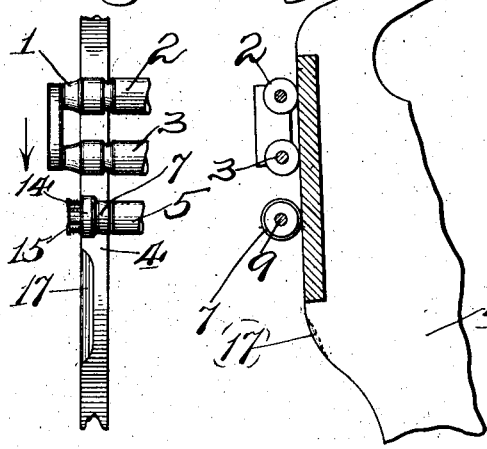
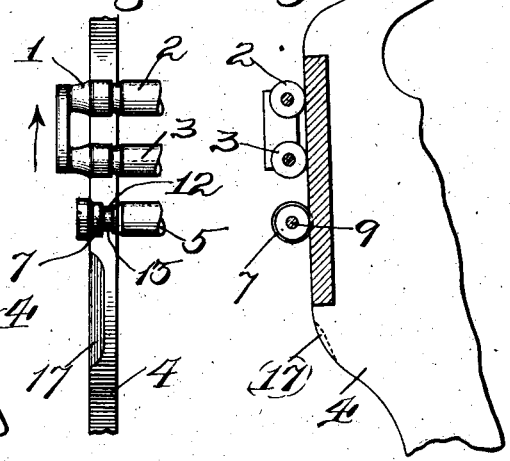
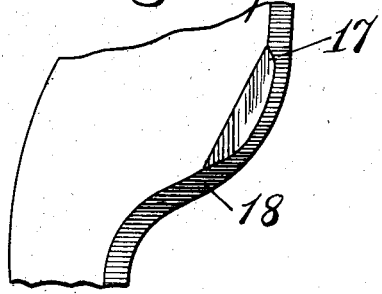
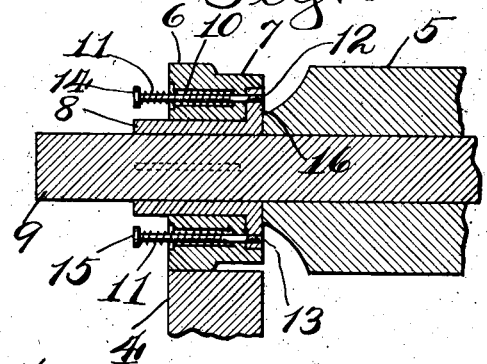
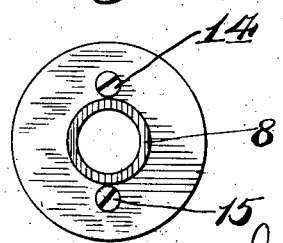
Witnesses
J. B. Weir
Robert H. Weir
Inventor
James E. Lee
by Elliott & Hopkins attys
THE NORRIS PETERS CO., WASHINGTON, D. C.

UNITED STATES PATENT OFFICE.

JAMES E. LEE, OF GRAND HAVEN, MICHIGAN.

INKING-ROLL TRUCK FOR PRINTING-PRESSES.

No. 834,308.  Specification of Letters Patent.  Patented Oct. 30, 1906.

Application filed August 1, 1904. Serial No. 218,960.

*To all whom it may concern:*

Be it known that I, JAMES E. LEE, a citizen of the United States, residing at Grand Haven, in the county of Ottawa and State of Michigan, have invented certain new and useful Improvements in Inking-Roll Trucks for Printing-Presses, of which the following is a full, clear, and exact specification.

My invention relates to trucks for the inking-rolls of printing-presses, and more particularly to the truck for the supplemental roll, which is usually designed to remain aloof from the type during the stroke or travel in one direction, but to engage and ink the form during the return stroke, each of the roller-trucks of the supplemental roll being provided with high and low treads, the former of which rests upon the track going in one direction and supports the inking-roll and the latter engages the track going in the opposite direction and allows the inking-roll to contact with the form or type. To accomplish this, it has heretofore been proposed to make the two treads separate or independent and connect them together by some yielding means, such as a spring, whereby the high tread may be derailed by a suitable cam or depression on the track, and thereby permitting the low tread to come down against the track and to remain in contact therewith until the truck runs off the end of the track where the inking-roll passes on to the inkplate, whereupon the spring draws the high tread inwardly again in position to engage the track when the roll makes its movement in the opposite direction.

The primary object of my invention is to make the two treads substantially integral, so as to not only reduce the cost of production, but to afford more room for the springs and enable same to be made considerably longer than heretofore, whereby the life thereof will be materially prolonged.

With the described ends in view my invention consists in certain features of novelty in the construction, combination, and arrangement of parts by which the said object and certain other objects which will hereinafter appear are attained, all as fully described with reference to the accompanying drawings, and more particularly pointed out in the claim.

In the said drawings, Figure 1 is a front elevation of one of the tracks, showing the truck passing downwardly with the supplemental roll elevated. Fig. 2 is a vertical section thereof. Fig. 3 is a view similar to Fig. 1, showing the truck during its upward movement with the low tread in contact with the track. Fig. 4 is a vertical section thereof. Fig. 5 is an enlarged detail perspective view of the switch for derailing the high tread. Fig. 6 is a longitudinal sectional view of the supplemental roll and its roller-truck on an enlarged scale, and Fig. 7 is an end view thereof.

1 is one of the roller-trucks of the regular inking-rolls 2 3, which traverse the tracks, one of which is shown at 4 in the drawings, but which, as well understood, are arranged one at each side of the press for supporting and guiding the inking-rolls during the operation of the press.

5 is the supplemental inking-roll which is intended to ink the form when going in one direction only and to remain out of contact when going in the opposite direction. Ordinarily in this art the supplemental roll 5 inks on the return or upward movement and remains aloof on the downward movement, and to the end that it may have this action it is formed or provided with a roller-truck possessing high and low treads. The high tread is indicated at 6 and the low tread at 7, and according to my invention these two treads are formed or made substantially in one piece and mounted upon a spindle or bushing 8, which in turn is fixedly mounted upon an axle or shaft 9 of the supplemental roll 5, and said truck is provided with an extended bearing upon the bushing directly under both of the treads.

The outer face or end of the roller-truck 6 7 is formed with one or more sockets 10 for receiving and accommodating coil-springs 11, which serve to return the roller-truck to its inward position, as shown in Fig. 6, with high tread 6 resting upon the track 4, and which springs are coiled upon pins 12 13, having heads 14 15 at their outer ends between which and the inner end walls of the sockets 10 the springs abut. These pins 12 13 pass loosely through the inner end walls of the sockets 10 and have their ends suitably secured in a flange 16, formed on or secured to the bushing 8, so that the roller-truck 6 7 may move freely in an axial direction over the pins 12 13 and after being moved outwardly will be again forced inwardly by the springs when not otherwise restrained. By thus forming the treads 6 7 integrally it will be seen that considerably more room for the sockets 10 is afforded than if the treads were formed of separable members, and consequently the springs may be made considerably longer than heretofore and their term of usefulness thereby considerably prolonged.

Each track 4 is provided, as usual, in its outer side with a switch for engaging and derailing the high tread 6, and while this switch may be any suitable expedient it is shown as a cam-shaped depression 17 in the lower bend 18 of the track 4, so that as the tread 6 goes downwardly during the downward stroke it will descend into this depression, and by the tapering formation of the lower end of the depression will be gradually pushed laterally against the action of the springs 11 until it engages over the outer edge of the track, where it remains during the upward stroke, as shown in Fig. 4, allowing the low tread to move into engagement with the track, and consequently permitting the supplemental inking-roll to ink the form, it being of course understood that the high tread is of a diameter sufficiently greater than that of the low tread to enable it to remain in contact with the lateral face or side of the track 4 during the upward stroke.

Having thus described my invention, what I claim as new therein, and desire to secure by Letters Patent, is—

In a device for the purpose described, the combinaton of a supplemental inking-roll, a bushing mounted thereon, a roller-truck comprising two treads relatively immovable, said truck being movable longitudinally on said bushing and having a bearing thereon directly under each of the treads, a spring-socket in the truck, pins secured to the bushing and passing through the base of the socket and projecting beyond the roller-truck, stops on the free ends of the pins, a spring surrounding each of the pins, with one end engaging the stop and the other end disposed within and engaging the base of the socket, said springs being adapted to move the roller-truck longitudinally on said bushing in one direction, and a track for said roller-truck comprising means for engaging the same and derailing said high tread.

JAMES E. LEE.

Witnesses:
F. A. HOPKINS,
M. B. ALLSTADT.